United States Patent
Kay et al.

(10) Patent No.: US 6,377,269 B1
(45) Date of Patent: Apr. 23, 2002

(54) AUTOMATED GENERATION OF MASKS FOR PHOTO-COMPOSITING

(76) Inventors: Robert L. Kay, 4901 Boulder Run, Fort Worth, TX (US) 76109; Carl B. Brandenberg, 101 S. Jennings, Suite 214, Fort Worth, TX (US) 76104

(*) Notice: Subject to any disclaimer, the term of this patent is extended or adjusted under 35 U.S.C. 154(b) by 0 days.

(21) Appl. No.: 09/322,447

(22) Filed: May 28, 1999

Related U.S. Application Data

(60) Provisional application No. 60/087,288, filed on May 29, 1998.

(51) Int. Cl.[7] .................................................. G09G 5/00
(52) U.S. Cl. ........................ 345/589; 345/590; 345/592; 345/620; 345/626; 348/584; 348/578; 382/162
(58) Field of Search ................................ 345/418, 431, 345/433, 435, 473, 434, 113, 114, 115, 118, 121, 586, 589, 590, 591, 592, 593, 596–597, 612–614, 619–626, 640, 643, 469.1; 348/239, 241, 584, 586, 587, 578, 473; 382/162–169, 199, 266, 274–284

(56) References Cited

U.S. PATENT DOCUMENTS

| | | | | |
|---|---|---|---|---|
| 5,870,097 A | * | 2/1999 | Snyder | 345/426 |
| 5,914,748 A | * | 6/1999 | Parulski | 348/586 |
| 5,940,139 A | * | 8/1999 | Smoot | 348/584 |
| 5,953,076 A | * | 9/1999 | Astle | 348/581 |
| 5,982,350 A | * | 11/1999 | Hekmatpour | 348/586 |
| 6,008,820 A | * | 12/1999 | Chauvin | 345/418 |
| 6,042,235 A | * | 3/2000 | Machtig | 353/28 |
| 6,084,590 A | * | 7/2000 | Robotham | 345/473 |
| 6,167,206 A | * | 12/2000 | Hylen | 396/316 |

* cited by examiner

Primary Examiner—Matthew Luu
Assistant Examiner—Wesner Sajous
(74) Attorney, Agent, or Firm—Mel A. Hunn

(57) ABSTRACT

An image processing method useful for producing images of subjects for inclusion in composite images, said processing method utilizing multiple images, including a first image of a foreground subject plus a first background, and a second image of said foreground subject plus a second background. The two images are digitally processed to generate a third image of the foreground subject alone, accurate in color and transparency without any color contribution from either background.

8 Claims, 10 Drawing Sheets

AUTOMATED GENERATION OF MASKS FOR PHOTO-COMPOSITING

This application claims the benefit of U.S. Provisional patent application Ser. No. 60/087,288; filed May 29, 1998, entitled "Automated Generation of Masks for Photo-Compositing."

BACKGROUND

1. Field of the Invention

The present invention relates generally to the field of photography, and in particular to the manipulation of multiple images in order to isolate a particular subject of those images for use in electronic photo-compositing. More specifically, the present invention relates to a method for electronically processing multiple images of a foreground subject taken on different backgrounds in order to generate a new image of the foreground subject completely removed from the backgrounds, said new image of foreground subject being true in color and transparency for use in photo-realistic, composite images.

2. Description of the Related Art

A number of existing methods allow users of electronic imaging systems to extract a foreground subject from a scene in an image, isolating said subject from the background of the scene so that the subject may later be composited into a different scene in another image. However, existing methods have a number of deficiencies, including being mathematically inaccurate at determining correct colors and transparencies, requiring excessive user skill and attention, requiring costly, colored background materials, and generally producing results that are only marginally acceptable in many cases.

A first existing method requires the foreground subject to be photographed in front of a uniformly colored background so that a "chroma key" method or "blue screen" method may be used to isolate the foreground subject from the uniformly colored background. An example of this method is described in U.S. Pat. No. 5,424,781. This method can yield acceptable results, but it commonly produces resulting images with fringes of color around the foreground subject's edges, poor reproduction of small features, inaccurate color values in transparent areas of the subject, and it typically requires a high level of user skill and attention. In addition, a carefully chosen background color must be used because if the chosen background color appears anywhere in the foreground subject, this method will also assume that these colored areas are part of the background and will incorrectly treat these areas as transparency in the resulting mask even though the foreground subject may have been that color and fully opaque at that point.

A second existing method uses two images, a first image of a foreground subject on a background and a second image of the said background alone. In this method, a difference image is calculated from the first and second image to be reapplied to the first image to isolate the foreground subject from the background. Unfortunately, this method suffers from some of the same problems as the "blue screen" method above. If the foreground subject contains a color at a location in the image that is similar to the color of the background at that same location in the image, this method will interpret the color at this location as part of the background and will incorrectly assume it is the background, resulting in transparency in the mask even though the foreground subject may have been fully opaque at that point.

A third existing method allows the subject to be photographed on any background and electronically "cut" out of the background using software tools available in such digital image editing programs as Adobe Photoshop. However, if the foreground subject has more than a small amount of detail, it usually becomes a time-consuming and difficult process that yields poor results with high-contrast edges that do not blend smoothly in composite photographs.

SUMMARY OF THE INVENTION

The present invention is directed to overcoming the problems set forth above. This invention is a new and unique method for generating masks required for electronic photo-compositing of multiple images. The method described herein uses two images of a foreground subject to calculate an accurate mask, each image captured from the exact same viewpoint but each image having a unique background. By using two images of the same foreground subject on at least two different backgrounds, it is possible to accurately calculate the exact mathematical solution to the amount-of-transparency problem. In fact, this method can accurately calculate the transparency as multiple color channels of transparency, rather than as a single monochromatic channel as all existing methods do. This allows reproduction of the true color filter effects of the transparent areas of the foreground subject.

It is necessary to set realistic goals for the functionality of the present invention. Inconsistent lighting, automatic exposure cameras, and camera noise will always interfere with an ideal, fully automated solution, but it is possible to automate the most difficult part of generating a mask with edges that are free of fringes and artifacts. The resulting image and mask can be used in many popular imaging and animation software packages, usually with little or no additional editing required.

It is a goal of the present invention to provide a 100% true and accurate solution to the amount-of-transparency problem. Photographers and designers want to minimize the destructive effects of any image manipulation in order to maintain the original image fidelity. All previous methods used to generate masks have deficiencies such as hard edges, edges with fringes of unwanted colors, the inability to produce semi-transparent areas of the proper colors, and the inability to produce color filter effects. These deficiencies hinder the reuse of the resulting image because the image typically has visible artifacts that are unacceptable on all but a select number of backgrounds that minimize the visible artifacts. As the accuracy and fidelity of the masked image approaches the true transparency values, the visible artifacts are reduced or eliminated and the ability to reuse the image in multiple ways increases dramatically. With no visible artifacts or flaws, the image may be re-composited with any choice of backgrounds, or used in ways that other masking methods would not allow. This reuse has many benefits. The need to take and store multiple images, each tailored or made suitable for a particular application or use, is eliminated. It gives the designer greater freedom of design and the ability to make rapid design changes. It also reduces the amount of film and prints and the number of digitized images which must be stored, which in turn, saves money and resources.

It is a further goal of the present invention to solve the most difficult parts of mask generation in an automated way, drastically reducing the amount of editing required before the image can be used. It is very likely that future hardware and software improvements will provide the operator with even more advanced tools than are currently available to improve the software-generated mask.

It is a further goal of the present invention to minimize user effort. With a goal of reducing the overall time and skilled effort required to produce a finished image and mask, the entire production process was examined, from photography to final image placement. Current blue/green screen techniques and other image editing tools only focus on the post-processing, or editing stage that occurs after the images have been captured and digitally transferred into a computer. Understanding that additional information can be gathered at the photography stage that would virtually eliminate the need for post-processing or editing, the method described herein substitutes a small additional level of effort during photography to greatly reduce the amount of skilled effort required during post production. The result is a method that requires two unique photographs to be taken during the photography stage, but that requires little or no image editing before the resulting image with transparency mask can be used. Overall, the total amount of user effort, from photography to final image placement, is drastically reduced. Even though this method requires the capture of one additional image, the process of acquiring this additional image is rapid and does not place any new skill requirements on the photographer. In addition, the method does not introduce any new lighting techniques or equipment requirements, and it can assumed that photographers are already knowledgeable in lighting techniques and possess any equipment necessary to perform this method. If the photographer chooses, the actions of changing backgrounds and digitally capturing the two images can even be semi-automated, further reducing the workload in most cases. After the images are captured, most of the work is done for the operator by the software.

It is a further goal of the present invention to make the process as easy as possible for the photographer, even though the majority of the effort required to achieve a usable image and mask is shifted away from a post-processing stage to the photography stage. As mentioned above, this method does not introduce any new techniques or equipment requirements to the photographer. All of the skills and equipment required by this process are also required for everyday photography. The cost of specially colored paints and backgrounds required by blue/green screen techniques is eliminated since the present invention may utilize black and white backgrounds that can commonly be found in any photo studio. To simplify the lighting set-up, the present invention can provide compensation for unevenly lit backgrounds. It is not necessary to make the illumination of the background uniform, which helps save the photographer time and effort during set-up. The ability of an implementation of the present invention to interface with a digital camera and optional capture images electronically allows almost immediate review of the resulting image so that the photographer can judge the fidelity of the image on-the-spot. There is no need to wait for post-process editing to occur to see a final image. And by applying an automated-background changing device to an implementation of the present invention, the manual action of changing the background can be eliminated. The ability of the present invention to interface with a background changing device and a digital camera can produce a highly automated system that further reduces the effort required to capture images.

It is a further goal of the present invention to produce an image and mask solution in a compatible format suitable for use in popular imaging and animation software packages. The most widely used still-image processing software is Adobe Photoshop, and it is important that a compatible color space and file format be supported. Also supported is the export of raw color data with a matching mask, a format commonly used in non-linear video editing systems.

It is a further goal of the present invention to produce a mask solution that can reproduce color filter effects in photo-composite images. Current imaging and animation software packages can only utilize a single alpha channel and support simple transparency, but it is possible to reproduce the color filter effect in Adobe Photoshop using multiple layers with appropriate blending modes. It is likely that future imaging and animation software packages will make use of multi-channel masks to provide support for color filter effects. An implementation of the present invention may simply convert the multiple channel alpha values to a single alpha channel using a weighted sum of the color components to produce a luminance channel, similar to methods used in color to grayscale image conversion.

DETAILED DESCRIPTION OF THE INVENTION

Figure 1:
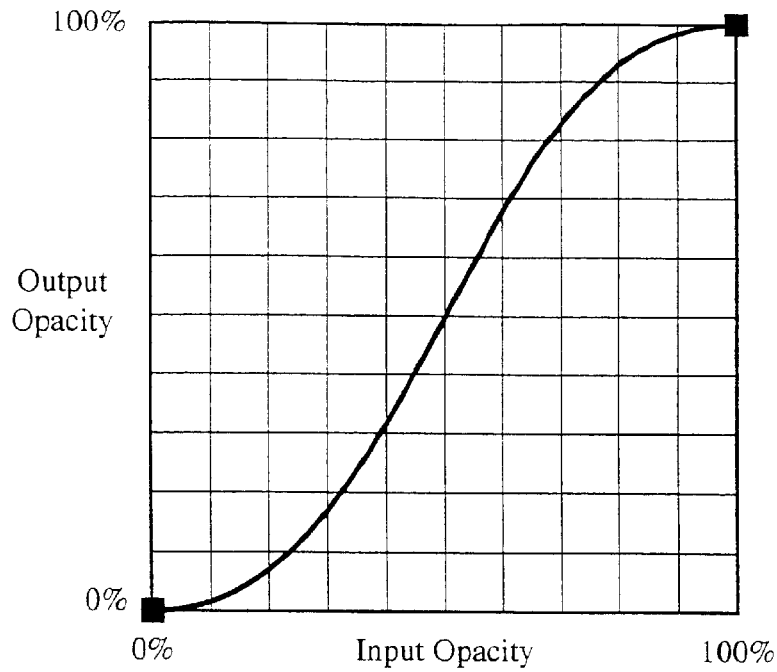
FIG. 1 illustrates a smooth and continuous transfer function converting input opacity values to new output opacity values.

With electronic publication now becoming the norm, and electronic photography rapidly replacing film for many applications, the process of electronic photo-compositing has become commonplace. Electronic photo-compositing is the process of combining two or more images using image-processing software on a computer workstation. The software typically operates using the concept of layers, each layer having two parts, an image and a mask. The image part contains the color information for each pixel that makes up the image, and the mask part contains the transparency of each pixel. Transparency allows an observer to look through an upper layer of an image and see one or more lower layers of the image showing through in varying amounts, much like looking through a picture that is painted on a sheet of glass. In most cases, where the composite image consists of only two layers, the mask of the upper layer determines the colors of the pixels in the composite image by controlling the color contributions from the upper layer, which represents the foreground subject, and from the lower layer, which represents the background.

The upper layer of a composite image typically contains one or more foreground subjects for which a mask must be produced in order to allow compositing into a scene in a composite photograph. Because present-day cameras are not currently capable of capturing transparency information, advanced methods must be used to produce a transparency mask for a foreground subject through other means. In order to produce a transparency mask for a foreground subject, a method must be applied that can process the data contained in opaque images in order to determine transparency information for the foreground subject. The present invention utilizes two images that are captured from the exact same viewpoint, each image with a unique background. These images may be captured using digital cameras or by scanning photographs captured with a traditional film camera.

The mathematics illustrated here apply to the RGB description of color. In the RGB color model, any visible color from white to black can be described by three values which each represents the proportional contribution of a particular wavelength of light—red, green or blue. The RGB color model was chosen for the preferred embodiment due to the standardization of RGB charge coupled devices (CCDS) in consumer and professional digital cameras and scanners. Because the present invention intends to minimize the amount of user effort required to produce an accurate image and mask, it was decided that the RGB color model was the most appropriate for the preferred embodiment because it allows the import and manipulation of data from digital cameras in their native color format. Since the native RGB format is sufficient for accurate transparency calculations, using it eliminates color changes that can occur when changing an image from one color model to another without proper color management that we will not discuss here. However, the present invention is not restricted to the RGB color model. The transparency calculations can be adapted to other color models such as HSB, HSV, CMY, CIE XYZ, CIE xyY, CIE Lab and CIE Luv in an analogous manner to the RGB color model of the preferred embodiment. Further, the preferred embodiment is sometimes described as it pertains to a single image characteristic or channel, for instance, the red color component channel. It should be understood, however, that identical or analogous operations are performed for each image characteristic or channel that the present invention is configured to use.

The image mask defines the transparency of an image at each pixel in the image. The transparency represents the amount of any background image that can be seen through the foreground image. For real-life objects, this transparency is a continuous spectral transmission curve with different transparency values at different wavelengths of light. Stained glass and photographic color filters illustrate this effect. The present invention is capable of calculating and exporting the spectral response as a color mask, however, it cannot be used directly by any known software packages. The effect that a color mask would provide must be simulated as described in the Summary of Invention. Most currently available image processing software simply reduces this spectral transmission curve to a single, average luminance value.

For each pixel in a composite image, the transparency value is used in this way:

$$red_{composite} = (red_{foreground} \times transparency) + (red_{background} \times (1 - transparency))$$

$$green_{composite} = (green_{foreground} \times transparency) + (green_{background} \times (1 - (transparency)))$$

$$blue_{composite} = (blue_{foreground} \times transparency) + (blue_{background} \times (1 - transparency))$$

Where:

composite=resulting composite image pixel color foreground=foreground image pixel color background=background image pixel color transparency=transparency channel or layer mask pixel value Red, green and blue values range from 0 to 1, where 0 is no color contribution, and 1 is full intensity color contribution. Transparency values also range from 0 to 1, where 0 is no transparency (fully opaque) and 1 is fully transparent. Color values can be represented in computer software with many numeric systems, from floating point to binary lengths such as 8, 16, or 32 bits. All of these values can be scaled to a range of 0 to 1 as illustrated here.

It is important to note that intermediate levels of transparency, between 0 and 1, can occur in two cases. The first case is when the object has partial transparency in some areas. Several examples are tinted or colored glass, smoke and haze, and translucent and transparent plastics. The second case is when total transparency only occurs in a fractional amount of a pixel. Because digitized electronic images are made up of pixels that represent a finite size sampling, object edges are unlikely to be exactly aligned with pixel boundaries and represented completely between two pixel samples, so partial-transparency will be common along the edges of even completely opaque objects. This is commonly referred to as anti-aliasing.

Each pixel of the object image captured against a solid background can be defined this way:

$$red_{image} = exposure \times ((red_{object} \times red_{object\_transparency}) + (red_{background} \times (1 - red_{object\_tranparency}))) + noise$$

$$green_{image} = exposure \times (green_{object} \times green_{object\_transparency}) + (green_{background} \times (1 - green_{object\_transparency}))) + noise$$

$$blue_{image} = exposure \times ((blue_{object} \times blue_{object\_transparency}) + (blue_{background} \times (1 - blue_{object\_transparency}))) + noise$$

Where:

image=captured image exposure=camera exposure level object=lighted object color background=background color noise=camera noise object_transparency=actual object transparency * object's percentage of pixel coverage The object_transparency is unique for each channel and the math can be performed on a per channel basis without performing a weighted sum of all of the channels. But because available image processing software can only utilize a single channel of transparency, it is treated as a single colored value for our math here. In a similar way, other reflected light is folded into the "object " and "object_ transparency " values.

Figure 3:
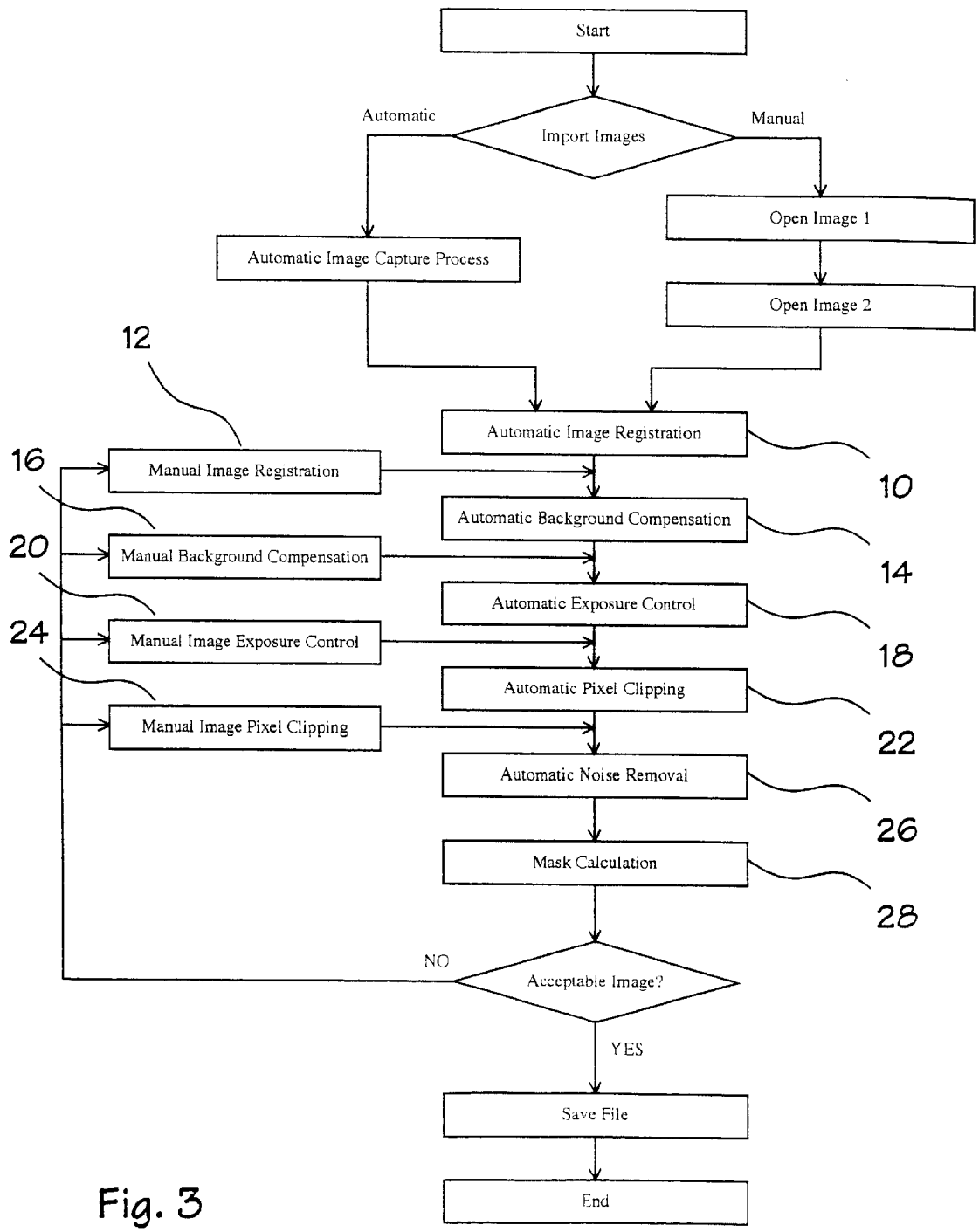
FIG. 3 is a flow chart illustrating the steps performed in a current implementation of the present invention.
Figure 14:
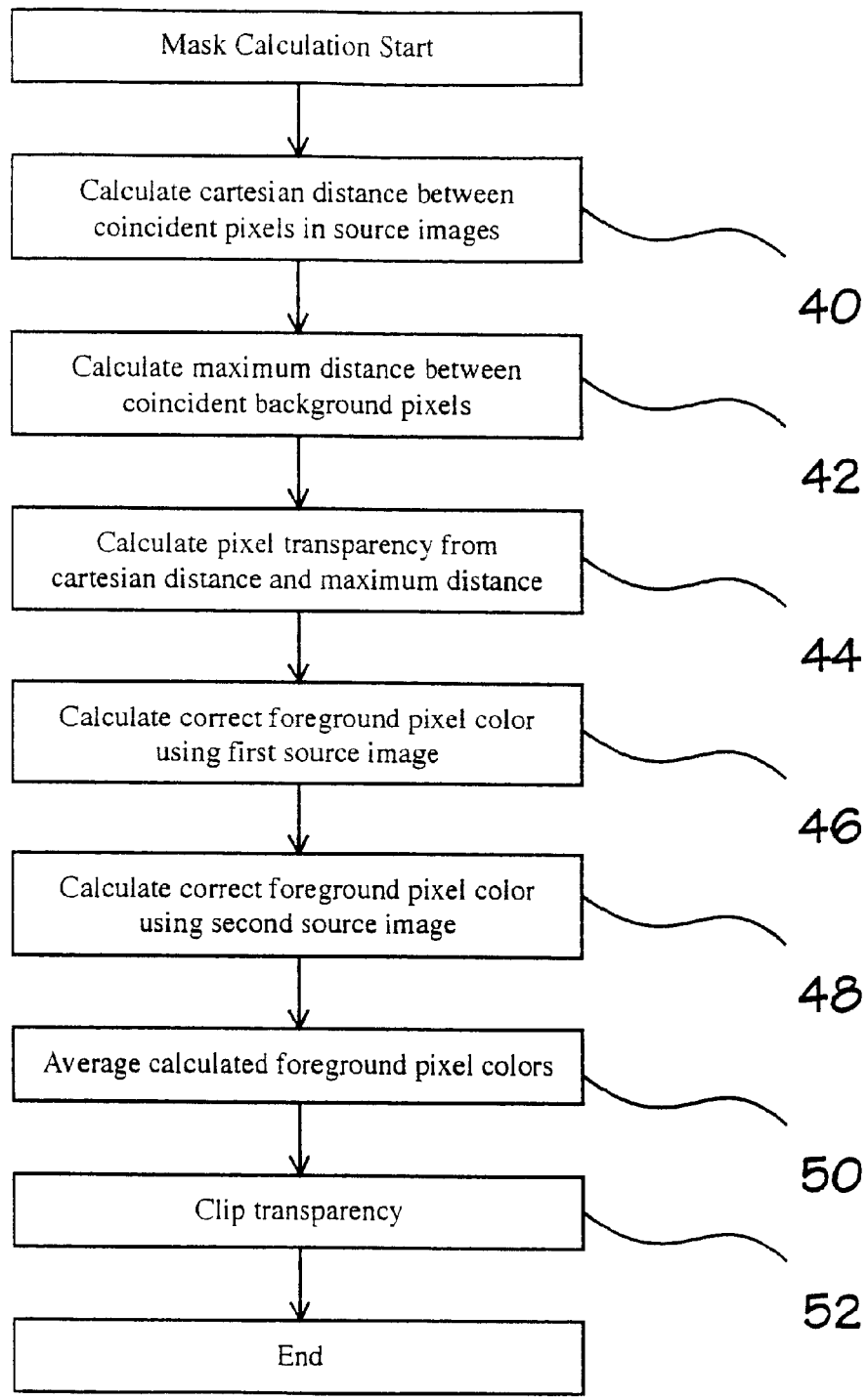
FIG. 14 is an expanded view of block 28 in FIG. 3 that graphically depicts the mathematical calculations described in the detailed description.

The following mathematics refer to FIG. 3 and FIG. 14. In theory, the level of transparency is directly proportional to the amount of change between the two images captured with different background colors. One method to combine the differences of the three color components of the two captured images is through a cubic color model, finding the Cartesian distance 40.

$$\text{cartesian\_distance} = \sqrt{(red_{image\_1} - red_{image\_2})^2 + (green_{image\_1} - green_{image\_2})^2 + (blue_{image\_1} - blue_{image\_2})^2}$$

This is then scaled based on the maximum distance between background colors in a totally transparent part of the images 42.

$$\text{max\_distance} = \sqrt{(red_{background\_1} - red_{background\_2})^2 + (green_{background\_1} - green_{background\_2})^2 + (blue_{background\_1} - blue_{background\_2})^2}$$

The transparency is then calculated 44 by:

$$\text{transparency} = \frac{\text{cartesian\_distance}}{\text{max\_distance}}$$

Where:
 cartesian_distance=Cartesian distance between images on two backgrounds
 image_2=image taken on first color background
 image_2=image taken on second color background
 background_1=first background color
 background_2=second background color In addition to the generation of a mask, it is necessary for the process to generate an object image whose pixels are of the proper colors and intensities, as if they had no transparency. This often overlooked step is necessary for the compositing process to produce the expected results. The calculations 46 are done in this way:

$red_{out} = ((red_{image\_1} - red_{background\_1}) \times (1 - \text{transparency})) + red_{background\_1}$ $green_{out} = ((green_{image\_1} - green_{background\_1}) \times (1 - \text{transparency})) + green_{background\_1}$ $blue_{out} = ((blue_{image\_1} - blue_{background\_1}) \times (1 - \text{transparency})) + blue_{background\_1}$ OR (equivalently in the ideal case)48:

$red_{out} = ((red_{image\_2} - red_{background\_2}) \times (1 - \text{transparency})) + red_{background\_2}$ $green_{out} = ((green_{image\_2} - green_{background\_2}) \times (1 - \text{transparency})) + green_{background\_2}$ $blue_{out} = ((blue_{image\_2} - blue_{background\_2}) \times (1 - \text{transparency})) + blue_{background\_2}$ If transparency=1.0 (fully transparent) the "out" color is irrelevant and may be set to 0.

With:
 out=output image with proper colors and intensities
 image_1=image taken on first color background
 image_2=image taken on second color background
 background_1=first background color
 background_2=second background color The math described herein will function ideally under the following conditions: 1) images are perfectly aligned, 2) background colors are perfectly uniform, 3) exposure levels are identical, 4) none of the image information is lost through "clipping", and 5) there is no noise in the image. Because real world conditions are rarely ideal, the deleterious effects of non-ideal conditions can be minimized (although not eliminated) through the processes described in the following sections. In general, the solution requires multiple passes through the image data.

The algorithm of the preferred embodiment relies on two images which represent the same foreground subject against different backgrounds. If there is mis-registration between the two supplied images, edge detail may be lost. Registration errors could be caused by slight camera movement between image captures or from misalignment during scanning for images photographed with film. An alignment tool provides both semi-automated 10 and manual 12 sub-pixel alignment of the images in both translation and rotation.

Since knowing the two background image colors accurately is necessary for a good transparency calculation, there must be compensation 14 and 16 for background lighting variations. This compensation is accomplished by estimating areas of near complete transparency through an initial pass. These estimated transparent regions are assumed to represent fully background pixels. The color of the background in the regions of the image not estimated to be transparent is interpolated with a cubic spline from the available data and then used as a background reference color.

With auto exposure enabled in the photographic camera, the different colored backgrounds will cause the two images to be of different brightness. This exposure difference will skew the transparency calculations if not removed. Through a similar process to the background compensation described above, during an initial pass opaque areas of the image are estimated. One of the source images is then scaled to "best fit" (in a least-square way) the other image, approximately compensating 18 for the exposure difference. A manual compensation 20 may also be applied.

Often when black is used for the darker background, the camera's dynamic range is unable to resolve the low light levels and the image data is "clipped" to a minimum value. This will skew the transparency calculations. Because the information is totally lost in this case, the assumption must be made that the lighting variation across the dark background matches that of the lighter background, so the same compensation calculation 14 and 16 as described above for the lighter background is applied to the darker background. Both images must be checked for "clipped" pixel color components 22 and 24, and both high and low and compensation 14 and 16 must be applied if the clipping does not occur at that pixel in both images.

The technologies used in electronic cameras add a small amount of noise to the images due to the nature of their imaging methods. More significantly, electronic cameras typically collect more luminance information than chromanance (color) information and rely on interpolation techniques to fill in the color data. This occasionally leads to "sparkle" effects around bright pixels. Assuming good registration (alignment) of the image on two backgrounds, the low-level noise can be slightly reduced through an averaging 50 of the two color calculation solutions 46 and 48 that yield redout, greenout and blueout as illustrated previously.

Figure 2:
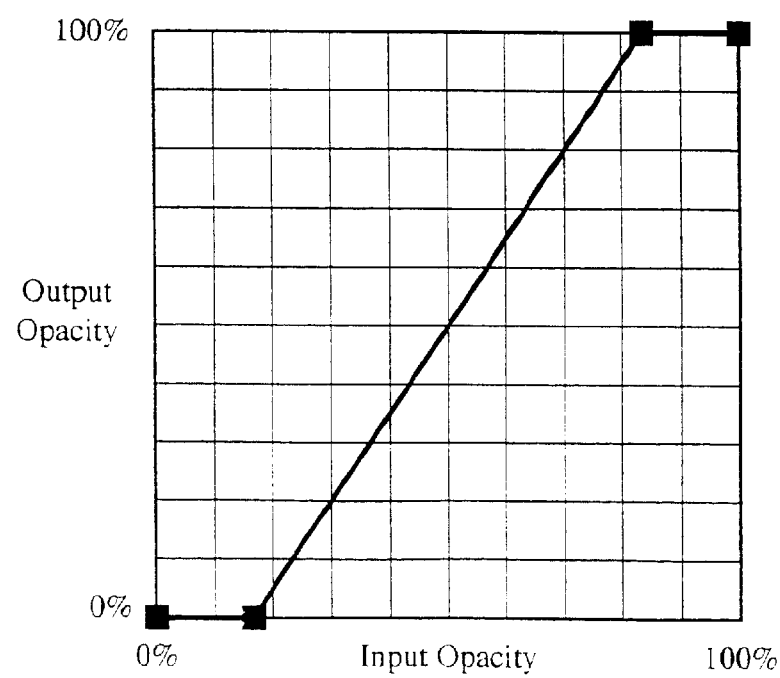
FIG. 2 illustrates a discontinuous transfer function converting input opacity values to new output opacity values.

Since it is possible for parts of an image that should be opaque to display slight amounts of transparency, it is sometimes necessary to clip the transparent pixels 52 to insure full transparency or to clip the opaque pixels to insure full opacity. Soft clipping as shown in FIG. 1 is used to adjust the transparency values to the desired opacity. Soft clipping produces smooth changes in the transparency values, as opposed to hard clipping as shown in FIG. 2, which produces sharp transitions which can degrade image quality.

Figure 4:
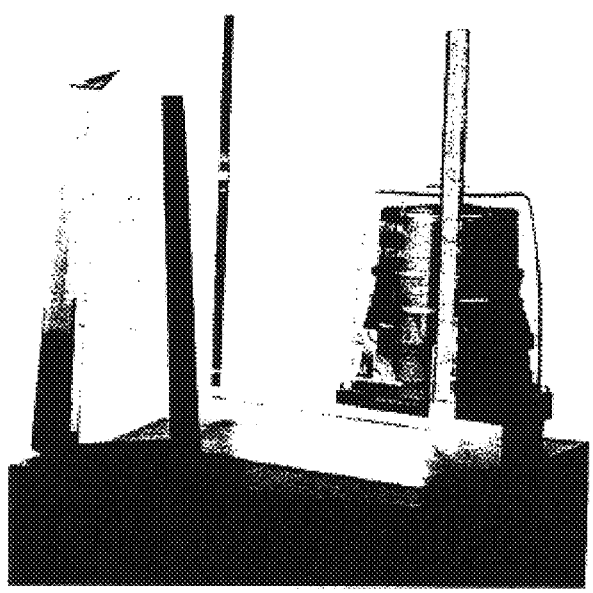
FIG. 4 is a first sample source image.
Figure 5:
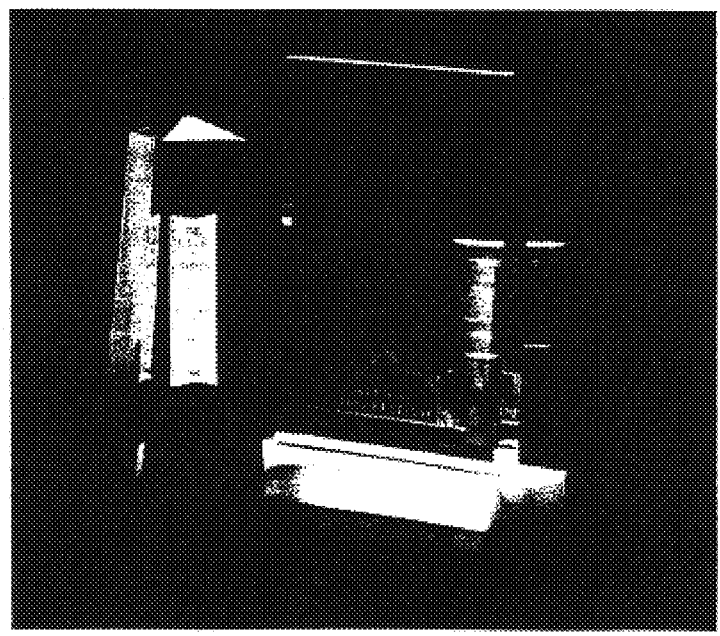
FIG. 5 is a second sample source image.

The images shown in FIG. 4 and FIG. 5 are two source images that were used to illustrate the functionality of the preferred embodiment of the present invention. FIG. 4 is a photograph of several transparent glass and plastic objects sitting on an opaque pedestal in front of a white backdrop. A gradient can be seen on the backdrop extending from the upper-left corner to the lower-right corner, illustrating the non-uniform lighting artifacts that regularly occur in everyday photography. FIG. 5 is a photograph of the same foreground objects taken in front of a black backdrop. Due to the limited dynamic range of the digital camera, the black background is sufficiently dark so as to hide the non-uniform lighting gradient that can be seen in FIG. 4.

Figure 6:
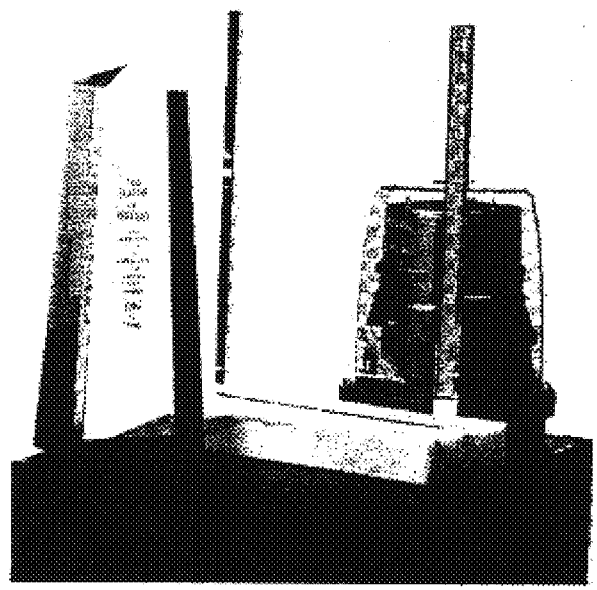
FIG. 6 is the image resulting from the processing of the first and second source images using the present invention.
Figure 7:
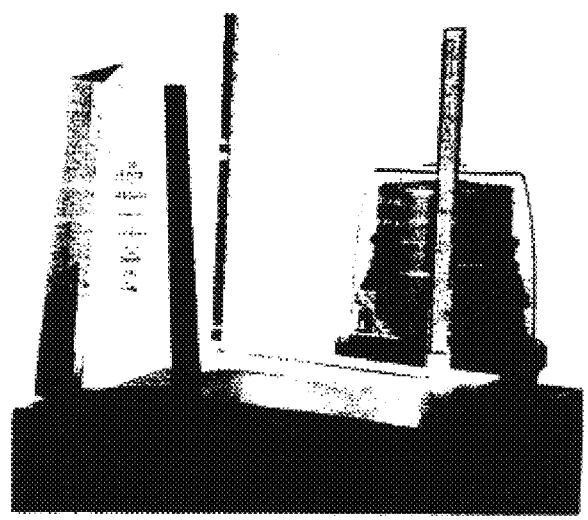
FIG. 7 is the same resulting image as FIG. 6 with an altered background.
Figure 8:
FIG. 8 is an image containing the data from the red, green and blue color channels of the image shown in FIG. 6.
Figure 9:
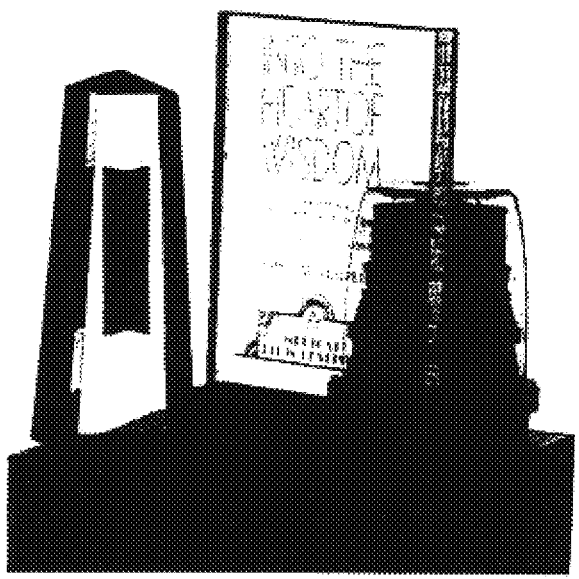
FIG. 9 is an image containing the data from the transparency channel of the image shown in FIG. 6.

The image in FIG. 6 is the result of the automatic masking process. Because the media on which these figures have been reproduced cannot simulate transparency, the transparent image has been superimposed over a checkerboard pattern to illustrate the effect of the transparency. This technique is used for on-screen display of images in such software packages as Adobe Photoshop. FIG. 7 shows this background checkerboard pattern partially removed to further illustrate the point. Because FIG. 6 is produced by applying a mask to a color image, the color image and mask and are shown separately in FIG. 8 and FIG. 9, respectively.

While not important to the mathematics of the present invention, it has been stated that a goal of the present invention is to make the process as easy as possible for the photographer. In order to reduce the effort required to change backgrounds between image captures, several methods are suggested and visually illustrated in FIGS. 10, 11, 12 and 13.

Figure 10:
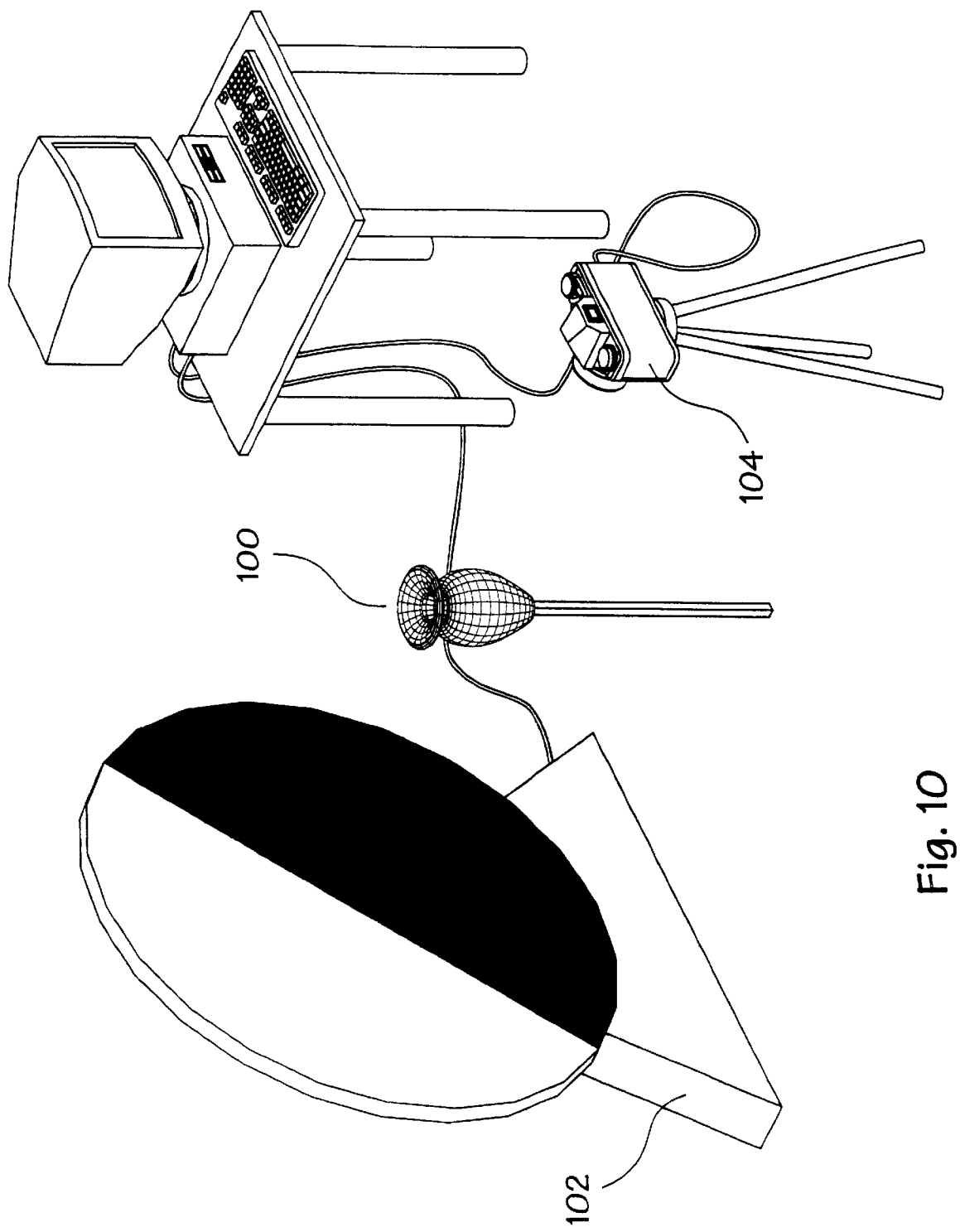
FIG. 10 illustrates a first suggested implementation of an automated background-changing device for use during photography. This figure illustrates a two color, rotating mechanism.

FIG. 10 illustrates a rotating mechanism that consists of a circular disk painted with contrasting colors such as white and black, each color covering an equal fraction of angular coverage of the disk. The disk is placed behind or under the object(s) 100 to be photographed and can be manually rotated or can be automated so that it rotates continuously. Sensors 102 provide feedback to the software to determine the angular position of the disk, which indicates which color is momentarily behind the object(s). In the case of the automated rotation, the shutter 104 of the camera is synchronized to trigger at the moment when the correct background color is behind the object. Software controls allow a single image to be captured with the user's choice of background color, or allows the automated capture of multiple, sequential images, each with the correctly selected background color. This background concept is very simple in design and allows very rapid changing of the background color for high image-capture frame rates.

Figure 11:
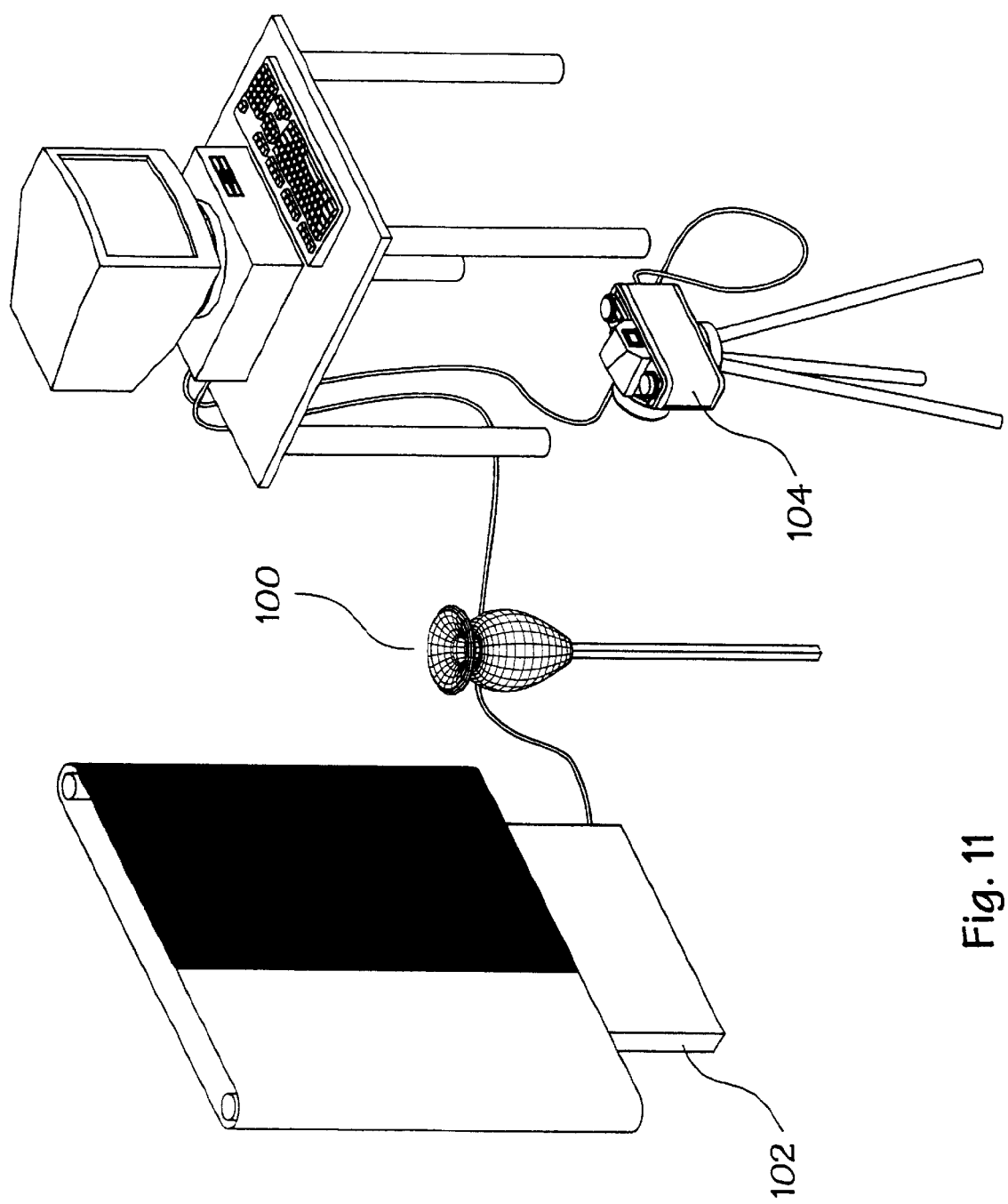
FIG. 11 illustrates a second suggested implementation of an automated background-changing device for use during photography. This figure illustrates a two color, revolving belt mechanism.

FIG. 11 illustrates a revolving belt mechanism (similar to that of a belt sander), painted with contrasting colors such as white and black, each color covering an equal fraction of surface area of the belt. The apparatus is placed behind or under the object(s) 100 to be photographed and can be manually indexed forward and/or backward or can be automated to index forward and/or backward continuously. Sensors 102 provide feedback to the software to determine the position of the belt, which indicates which color is momentarily behind the object(s). In the case of the automated indexing, the shutter 104 of the camera is synchronized to trigger at the moment when the correct background color is behind the object. Software controls allow a single image to be captured with the user's choice of background color, or allows the automated capture of multiple, sequential images, each with the correctly selected background color. If the apparatus is constructed of size and proportions matching that of the frame area of the camera, this concept can be very space-efficient.

Figure 12:
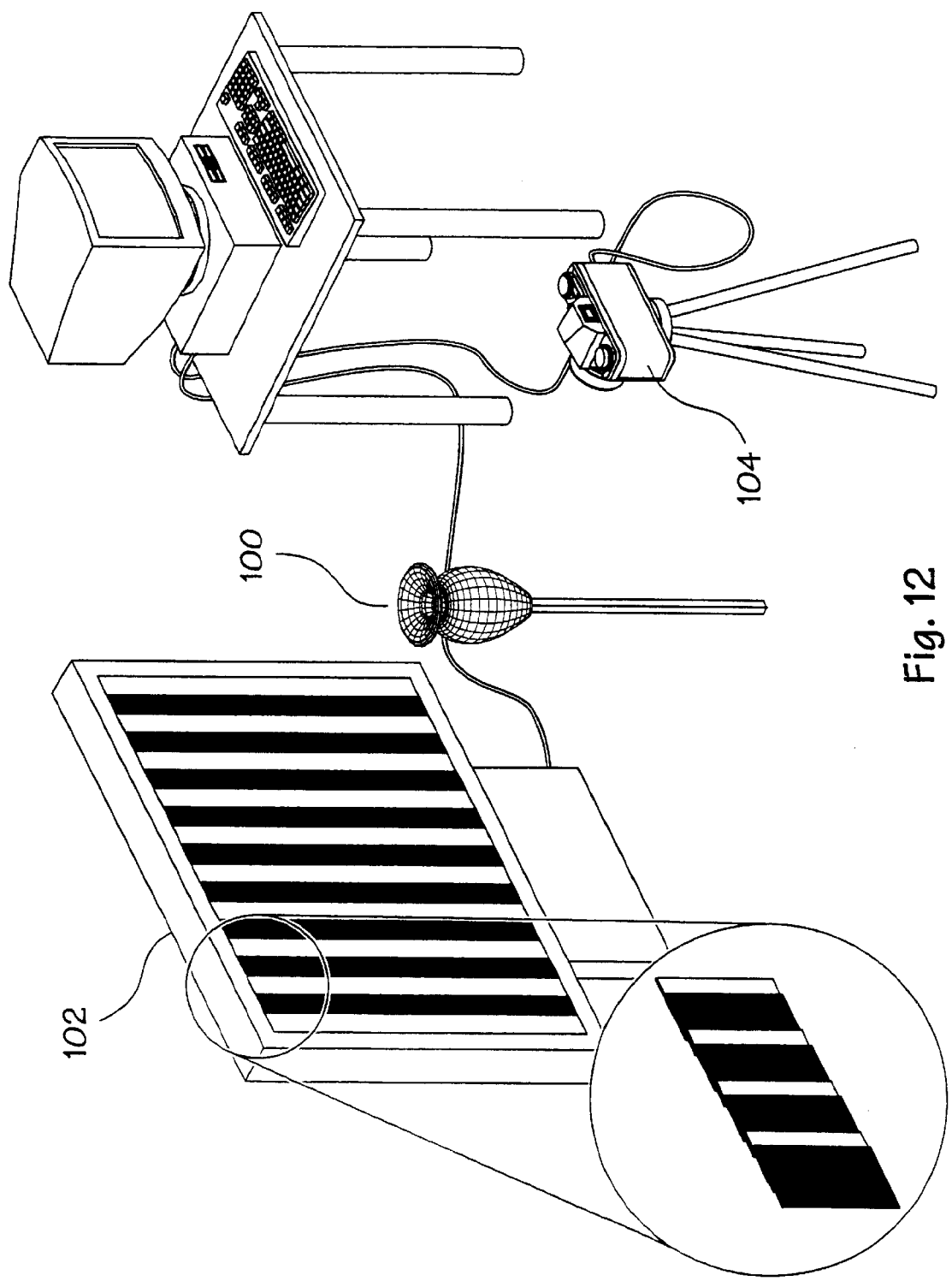
FIG. 12 illustrates a third suggested implementation of an automated background-changing device for use during photography. This figure illustrates a two color, sliding shutter mechanism.

FIG. 12 illustrates a two color, sliding shutter mechanism 102 consisting of a flat panel composed of interleaved slats of two or more different colors. The slats slide underneath one another, selectively exposing the ones with the desired color. The shutter mechanism is slid so that the slats of the first color are completely exposed behind the foreground subject 100 and one source image is captured by a camera 104. The shutter mechanism is then slid so that the slats of the second color are completely visible behind the foreground subject 100 and a second source image is captured. This method is very compact and allows very rapid changing of the background color.

Figure 13:
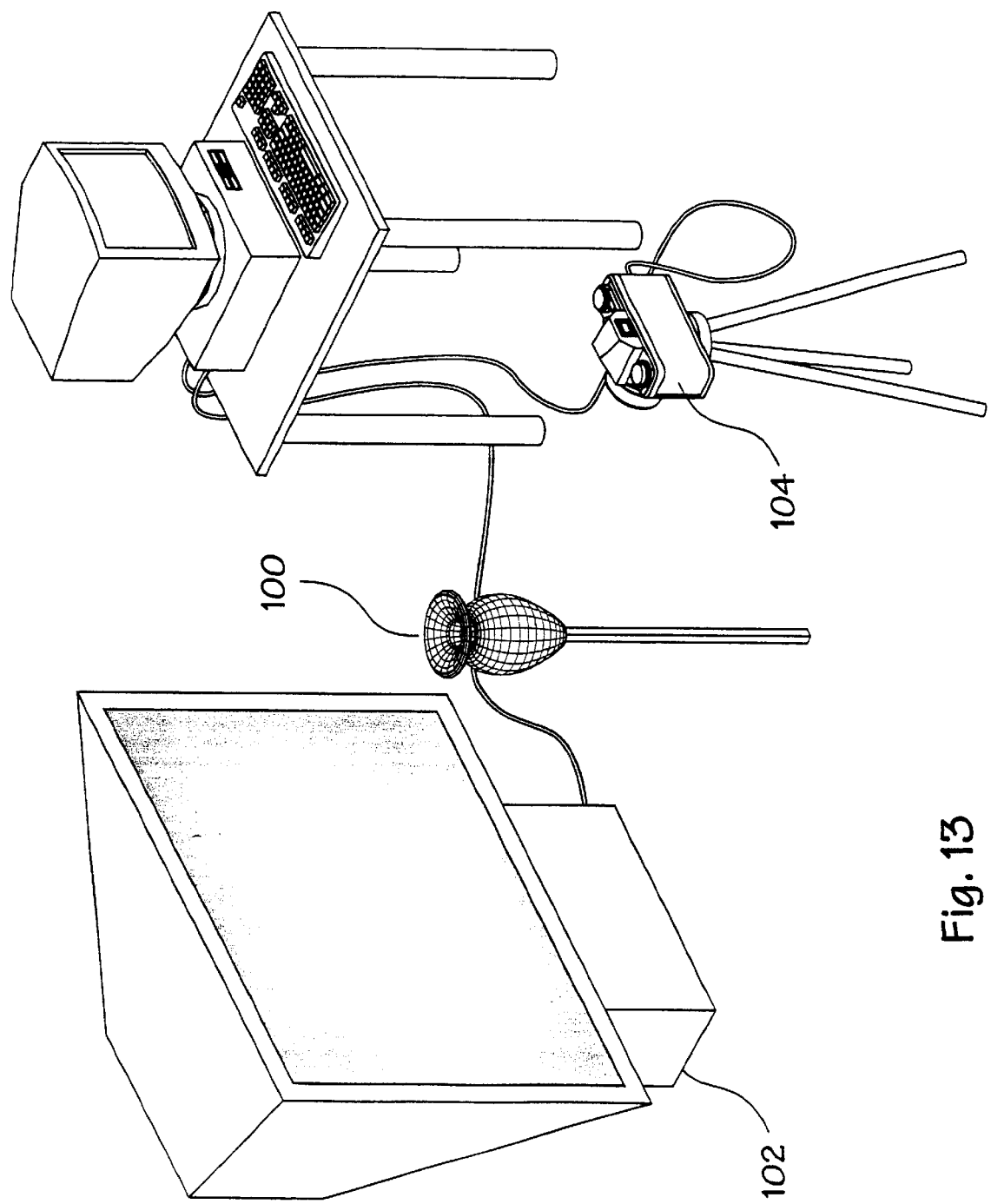
FIG. 13 illustrates a fourth suggested implementation of an automated background-changing device for use during photography. This figure illustrates an illuminated screen mechanism.

FIG. 13 illustrates an illumination source 102 with a highly diffuse covering is used to produce a uniformly illuminated surface. The illuminated surface is placed behind or under the object 100 to be imaged by a camera 104 and may be switched on or off (or varied in intensity) to provide the proper background color. The illumination source may be changed in color through use of a color filter if desired. This method allows virtually unlimited background color changes by simply changing of the level of the source illumination or by the addition and removal of color filters on the illumination source. It also allows for very rapid changing of the background color.

It is possible to use more than two source images. Improvements in image quality can be gained from taking additional shots, however, two images represents an optimum compromise in image quality, speed and ease of use.

Although the invention has been described with reference to a particular embodiment, this description is not meant to be construed in a limiting sense. Various modifications of the disclosed embodiments as well as alternative embodiments of the invention will become apparent to persons skilled in the art upon reference to the description of the invention. It is therefore contemplated that the appended claims will cover any such modifications or embodiments that fall within the scope of the invention.

What is claimed is:

1. A method of electronic photo-compositing comprising:
   (a) providing an object;
   (b) obtaining a digital photograph of said object with a first selected background;

(c) obtaining a second digital photograph of said object with a second selected background;

(d) requesting images of said object in said first digital photograph and said second digital photograph;

(e) calculating transparency values for a resulting image utilizing data from said first and second digital photographs; and (f) generating a composite digital image with transparent regions.

2. A method of electronic photo-compositing according to claim 1, further comprising:

(e) calculating transparency values, which represent a measure for each pixel of a scaled value representative of transmission of light through said object.

3. A method of electronic photo-compositing according to claim 1, further comprising:

(e) calculating color values, which represent a measure for each pixel of a scaled value representative of reflection of light from said object.

4. A method of electronic photo-compositing according to claim 2, wherein said transparency values represent for each pixel an amount of color contribution and an amount of transparency contribution.

5. A method of electronic photo-compositing according to claim 2, wherein said transparency values represent for each pixel an amount of color contribution and an amount of transparency contribution.

6. A method of compositing an image comprising:

(a) providing a first background having a first color for each pixel;

(b) providing a second background having a second color for each pixel which is uniquely different from said first color;

(c) providing an object to be photographed;

(d) obtaining a first digital image of said object against said first background;

(e) obtaining a second digital image of said object against said second background;

(f) wherein said first and second digital images are taken from an exact same viewpoint;

(g) calculating from said first and second digital images an amount of color contribution for each pixel and an amount of transparency contribution for each pixel.

7. A method of compositing an image according to claim 6, further comprising:

(h) utilizing said amount of color contribution and said amount of transparency contribution to generate a composite image.

8. A method of compositing an image comprising:

(a) providing a digital camera;

(b) providing a first background having a first color;

(c) providing a second background a second color which is uniquely different from said first color;

(d) providing an object with at least one transparent portion;

(d) obtaining a first digital image of said object against said first background;

(f) obtaining a second digital image of said object against said second background;

(g) registering said first and second digital images; and (h) for each pixel of said registered first and second digital images calculating an amount of color contribution and an amount of transparency contribution from said first and second digital images.

* * * * *